(12) United States Patent
Couture-Gagnon

(10) Patent No.: US 7,760,201 B2
(45) Date of Patent: Jul. 20, 2010

(54) TRANSFER OF ATTRIBUTES BETWEEN GEOMETRIC SURFACES OF ARBITRARY TOPOLOGIES WITH DISTORTION REDUCTION AND DISCONTINUITY PRESERVATION

(75) Inventor: Jérôme Couture-Gagnon, Longueuil (CA)

(73) Assignee: AUTODESK, Inc., San Rafael, CA (US)

( * ) Notice: Subject to any disclaimer, the term of this patent is extended or adjusted under 35 U.S.C. 154(b) by 450 days.

(21) Appl. No.: 11/493,221

(22) Filed: Jul. 26, 2006

(65) Prior Publication Data

US 2007/0024632 A1    Feb. 1, 2007

Related U.S. Application Data

(60) Provisional application No. 60/703,832, filed on Jul. 29, 2005.

(51) Int. Cl.
*G06T 15/00* (2006.01)
*G09G 5/00* (2006.01)

(52) U.S. Cl. .................... 345/419; 345/581; 345/606

(58) Field of Classification Search ................ 345/419, 345/581, 606
See application file for complete search history.

(56) References Cited

U.S. PATENT DOCUMENTS

| 5,767,861 | A  | 6/1998  | Kimura |
| 6,166,746 | A  | 12/2000 | Inada et al. |
| 6,203,425 | B1 | 3/2001  | Hayashi |
| 6,377,281 | B1 | 4/2002  | Rosenbluth et al. |

(Continued)

FOREIGN PATENT DOCUMENTS

| JP | 11-185055  | 7/1999 |
| JP | 2000-182076 | 6/2000 |
| JP | 2001-076177 | 3/2001 |

OTHER PUBLICATIONS

Michael Garland and Paul Heckbert, "Simplifying surfaces with color and texture using quadric error metrics," 1998, IEEE Visualization, Proceedings of Visualization '98, pp. 263-269.*

(Continued)

*Primary Examiner*—Xiao M Wu
*Assistant Examiner*—Lillian K Ng
(74) *Attorney, Agent, or Firm*—Patterson & Sheridan, LLP

(57) ABSTRACT

Attributes associated with components of a three-dimensional source geometry may be transferred to a target geometries having an arbitrarily different topology. The two geometries are placed in a general alignment in three dimensions. Correspondences are found between anchors for attributes in the target geometry and anchors for attributes in the source geometry. The identified correspondence locations on the source geometry are locally redistributed so as to ensure that concave regions of the source geometry are mapped to the target geometry, and that convex edges or vertices of the source geometry do not map to a large area on the target geometry. Attribute discontinuities in the source geometry are preserved in the target geometry by relating discontinuous edges in the source geometry to the target geometry. This relationship may map each discontinuous edge in the source geometry locally to the target geometry. Alternatively, this relationship may involve mapping discontinuous paths globally to the target geometry. Thus, the quality of attribute transfer is improved by reducing distortions introduced by the method through which correspondence between a target geometry and a source geometry is determined and/or by preserving discontinuities in attributes from the source geometry by relating discontinuous edges in the source geometry to the target geometry.

15 Claims, 11 Drawing Sheets

U.S. PATENT DOCUMENTS

| | | |
|---|---|---|
| 6,503,144 B1 | 1/2003 | Rimoto et al. |
| 6,535,215 B1 | 3/2003 | DeWitt et al. |
| 6,577,308 B1 | 6/2003 | Ohto et al. |
| 6,597,368 B1 | 7/2003 | Arai et al. |
| 6,626,759 B1 | 9/2003 | Matsuoka |
| 6,697,071 B2 | 2/2004 | Iino et al. |
| 6,976,918 B2 | 12/2005 | Hosokawa |
| 7,012,608 B1 | 3/2006 | Fujisaki |
| 2001/0004262 A1 | 6/2001 | Mochizucki et al. |
| 2002/0050997 A1 | 5/2002 | Iino et al. |
| 2002/0067363 A1 | 6/2002 | Ohto et al. |
| 2004/0012594 A1 | 1/2004 | Gauthier et al. |
| 2004/0160445 A1 | 8/2004 | Whatmough |
| 2006/0061574 A1 | 3/2006 | Ng-Thow-Hing et al. |
| 2006/0139355 A1 | 6/2006 | Tak et al. |
| 2006/0181535 A1 | 8/2006 | Watt |
| 2006/0262119 A1 | 11/2006 | Isner |
| 2006/0274070 A1 | 12/2006 | Herman et al. |

OTHER PUBLICATIONS

Hoppe, Hugues, "New Quadric Metric for Simplifying Meshes with Appearance Attributes," Oct. 25-28, 1999, Proceedings of the 10th IEEE Visualization 1999 Conference (VIS '99), pp. 59-66.*
ATI Technologies White Paper, "Truform," May 2001, ATI Technologies Inc.*
U.S. Appl. No. 11/496,217, filed Jul. 31, 2006, Smith.
Gleicher, Michael, "Retargetting Motion to New Characters", in Proceedings of SIGGRAPH 98, pp. 33-42, Jul. 1998.
English Translation of JP 11-185055.
English Translation of JP 11-185055, Jul. 9, 1999.

* cited by examiner

TRANSFER OF ATTRIBUTES BETWEEN GEOMETRIC SURFACES OF ARBITRARY TOPOLOGIES WITH DISTORTION REDUCTION AND DISCONTINUITY PRESERVATION

CROSS-REFERENCE TO RELATED APPLICATIONS

This application claims the benefit of priority to U.S. Provisional application Ser. No. 60/703,832 filed Jul. 29, 2005 and entitled "Transfer of Attributes Between Geometric Surfaces of Arbitrary Topologies with Distortion Reduction and Discontinuity Preservation", the contents of which are incorporated herein by reference.

BACKGROUND

Attributes may be transferred from a geometric surface having one topology, such as a polygon mesh, to another geometric surface of a different topology, such as a different polygon mesh. Example attributes that may be transferred include, but are not limited to, color, texture coordinates, animation values and rendering values that may be associated with a vertex, edge, face or face corner (also called a face-vertex pair or polygon nodes).

Attribute transfer is commonly used in the context of the creation of three dimensional (3D) objects for realistic visual entertainment, such as video games and films. Such 3D objects are defined by 3D geometric surfaces that typically have many associated attributes, such as texture coordinates, high quality textures, specular maps, normal maps, face materials, animation shapes and deformation weights.

To produce such entertainment, artists often design many similar 3D objects and create similar surface attributes and animation data for each of them. As an example, artists may have to design many characters, and create for each of them various actions, e.g., stand, sit, run, various expressions, e.g., smile, close eyes, say "A", and various colors and textures, e.g., normal maps, specular maps, surface parameterization for texture coordinates. However, because the topologies of the characters are often different, e.g., different number of polygons or different assembly, all the surface attributes often are created separately for each object. Artists also may create the same character at different levels of detail, each of which might have different topologies, but for which the surface attributes should be similar.

While some techniques are available for creating a new topology from an existing topology in a manner that preserves attribute discontinuities, such as subdivision surfaces and polygon reduction, such techniques are not applicable for transferring attributes between geometric surfaces of arbitrary topologies. In some cases, an artist will want to separately define the topologies of the higher and the lower resolution models. In these cases, there is no intrinsic relationship between the topologies of the models at different resolutions.

Where a specific relationship between two topologies is understood, it is also possible to transfer attributes by taking advantage of the known relationships. For example, one may register manually a correspondence between shapes. As another example, some tools permit texture coordinates to be created on a polygon mesh based on implicit spatial parameterizations defined by a specific implicit geometry, such as a cube or cylinder, or geometries having an implicit UV parametrization, such as a single NURBS surface. Neither of these techniques is generally applicable to transferring attributes between geometric surfaces of arbitrary topologies. Further, registration techniques often introduce distortions in the target geometry to force matching to the source geometry.

However, to transfer attributes between geometric surfaces of arbitrary topologies, one generally aligns the surfaces as closely as possible in three-dimensional space. Next, for all anchor points for attributes in the target geometry, the closest surface or closest vertex in the source geometry is determined. Given the closest surface or vertex locations on the source geometry, the surface attribute values at these locations are computed, optionally by interpolating between the closest anchor points for the surface attributes in the source geometry.

While this technique works with geometric surfaces of different topologies, and can be computed efficiently, it has several problems which make it less useful in practical applications. Two of these problems are distortion artifacts and surface attribute discontinuities.

Distortion artifacts may arise due to the nature of the closest surface and closest vertex calculations between the source and target geometries. Such distortion cannot be avoided in general, and generally arise around convex and concave portions of the surfaces.

A surface attribute discontinuity is a sharp variation of an attribute relative to the surface. An example is a well-defined frontier between two colors. In general, on a polygon mesh, attribute discontinuities define paths made of one or more connected edges. Discontinuity paths can intersect at vertices. Surface attribute discontinuities and their intersections often define visually important features. The general closest surface and closest vertex algorithms will not necessarily preserve such surface attribute discontinuities

SUMMARY

In the context of 3D content creation, attribute transfer should not be based on finding an ideal correspondence between source and target geometries. Instead, attribute transfer should be based on the general spatial placement that was preliminarily done by an artist, with attributes propagated based on that spatial relationship. In such a context, having multiple source regions corresponding to a same target region or vice versa can actually be the behavior wanted by the artist. Having a spatial correspondence which is predefined and globally controlled by the artist significantly reduces several types of undesirable distortions and artifacts, because most proportion or orientation mismatches between the source(s) and the target geometries reflect a choice taken by the artist.

Some distortions still arise, however, if a typical closest surface or closest vertex algorithm is used determine the correspondence between the artist aligned source and target geometries. These distortions can be reduced by locally redistributing the identified correspondence locations on the source geometry so as to avoid these artifacts. Methods for performing such local redistribution include an inverse ray casting technique and a modified inverse ray casting technique. This technique ensures that concave regions of the source geometry are mapped to the target geometry, and that convex edges or vertices of the source geometry do not map to a large area on the target geometry.

Attribute discontinuities in the source geometry are preserved in the target geometry by relating discontinuous edges in the source geometry to the target geometry. This relationship may map each discontinuous edge in the source geometry locally to the target geometry. Alternatively, this relationship may involve mapping discontinuous paths globally to the target geometry.

Thus, the quality of attribute transfer is improved by reducing distortions introduced by the method through which correspondence between a target geometry and a source geometry is determined and/or by preserving discontinuities in attributes from the source geometry by relating discontinuous edges in the source geometry to the target geometry.

DETAILED DESCRIPTION

Attributes may be transferred between any two arbitrary geometrical primitives, such as a polygon mesh, a NURBS surface mesh or other object that is a combination of vertices and edges that define faces in three dimensions. A three dimensional geometrical primitive G generally is defined as a set of n control vertices $V=\{V_i:1<=i<=n\}$, each being associated to a position triplet $P_{Vi}=(x_i, y_i, z_i)$. An example of a three-dimensional geometrical primitive is a mesh. A mesh is defined by specifying faces, vertices and edges. The vertices and edges define n-sided faces. Some three-dimensional meshes have edges that are not line segments, but may be curves. Some three-dimensional meshes also have faces that are not planar.

A mesh generally is represented in a computer by three arrays that store information about the vertices, edges (whether line segments or curves) and faces (whether planar or not). The data structure representing each vertex may include, for example, data defining its position as well as the indices of the neighboring edges and faces. The data structure representing each edge may include, for example, data defining the indices of its end vertices and the indices of the two adjacent faces. The data structure representing each face may include, for example, data defining the indices of its neighboring faces, edges and vertices.

There are many kinds of attributes, such as color, texture, animation values and rendering values, that can be associated with a mesh. Generally, the component of a geometry to which the attribute is associated is called an anchor. The anchor may be a vertex, node, edge or face of a mesh, for example. Example attributes that may be associated with vertices of a mesh include, but are not limited to weight maps (scalar values for various uses), envelope weight maps (also called "deformation weights"), specular maps, and animation shapes (vectors). Example attributes that may be associated with nodes of a mesh, which are face corners or vertex polygon pairs, include, but are not limited to texture coordinates, vertex colors, and user-defined normals. Example attributes that may be associated with polygons of a mesh include, but are not limited to, textures, face material groups and clusters (for various uses). Example attributes that may be associated with edges of a mesh, include, but are not limited to, information about hard edges or crease edges.

As noted above, artists may create several different meshes for the same character, or may create several different characters that have a need for sharing surface attributes. In these cases, it would save significant time to be able to readily transfer attributes from one mesh to another.

Figure 1:
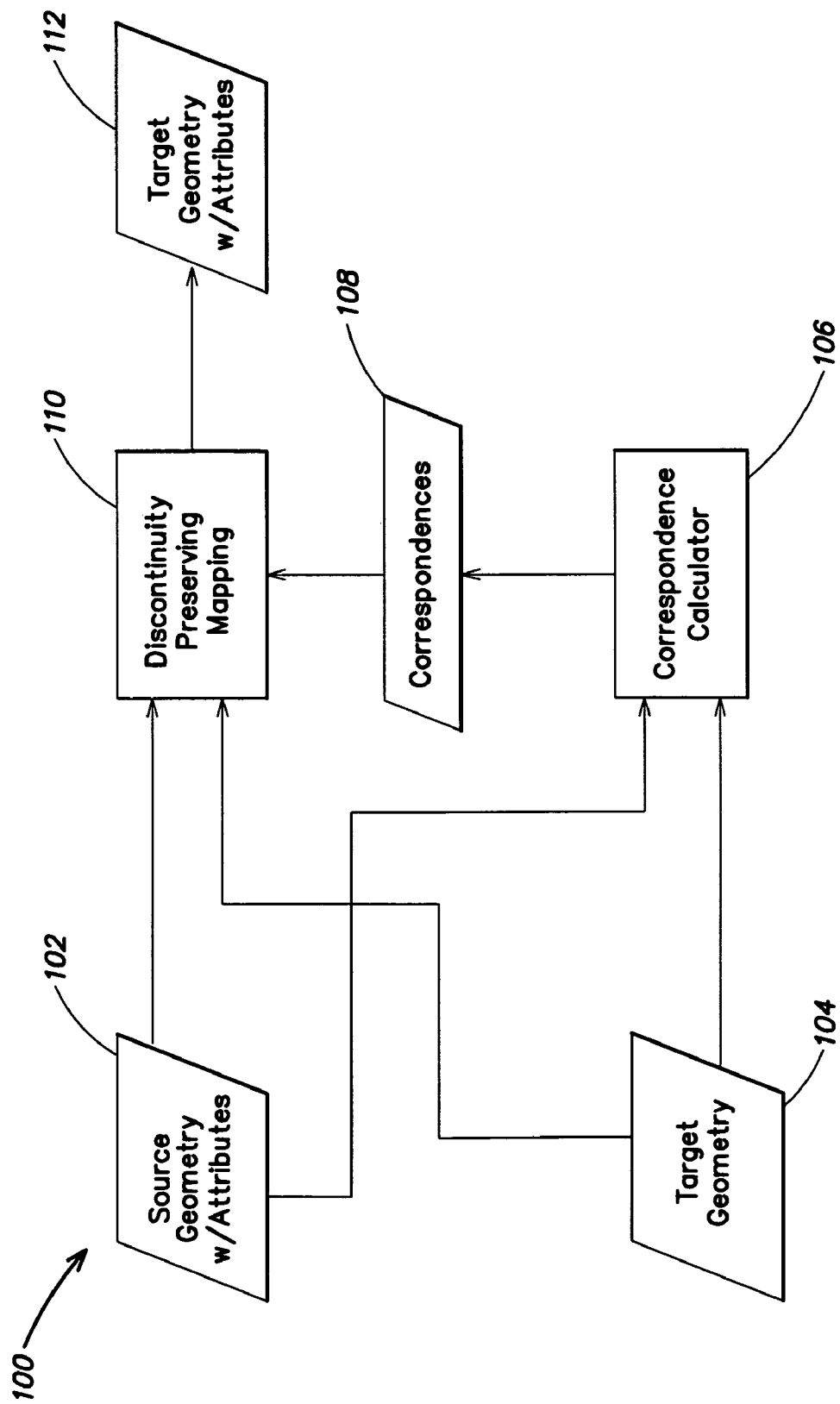
FIG. 1 is a dataflow diagram illustrating an example system for transferring attributes from a source geometry to a target geometry.

Referring now to FIG. 1, a dataflow diagram illustrates an example system 100 for transferring attributes from a source geometry 102 with attributes to a target geometry 104. The source geometry and target geometry are input to a correspondence calculator 106 which determines, using a closest surface, closest vertex, or other equivalent method, for each vertex in the target geometry the corresponding surface on the source geometry. These correspondences 108 between vertices and surfaces are input, along with the source and target geometries 102 and 104 to a discontinuity preserving mapping 110 of the attributes from the source geometry to the target geometry. The result is the target geometry with attributes, as indicated at 112. The implementation of the discontinuity preserving mapping 110 is generally independent of the implementation of the correspondence calculator 106.

An artist initiates the attribute transfer process by placing the source and target geometries in alignment with each other. Given this placement, there are several methods that may be used to compute the correspondence between the source and target geometries. Such methods include closest surface, closest vertex and, as described below, inverse ray casting techniques.

Figure 2:
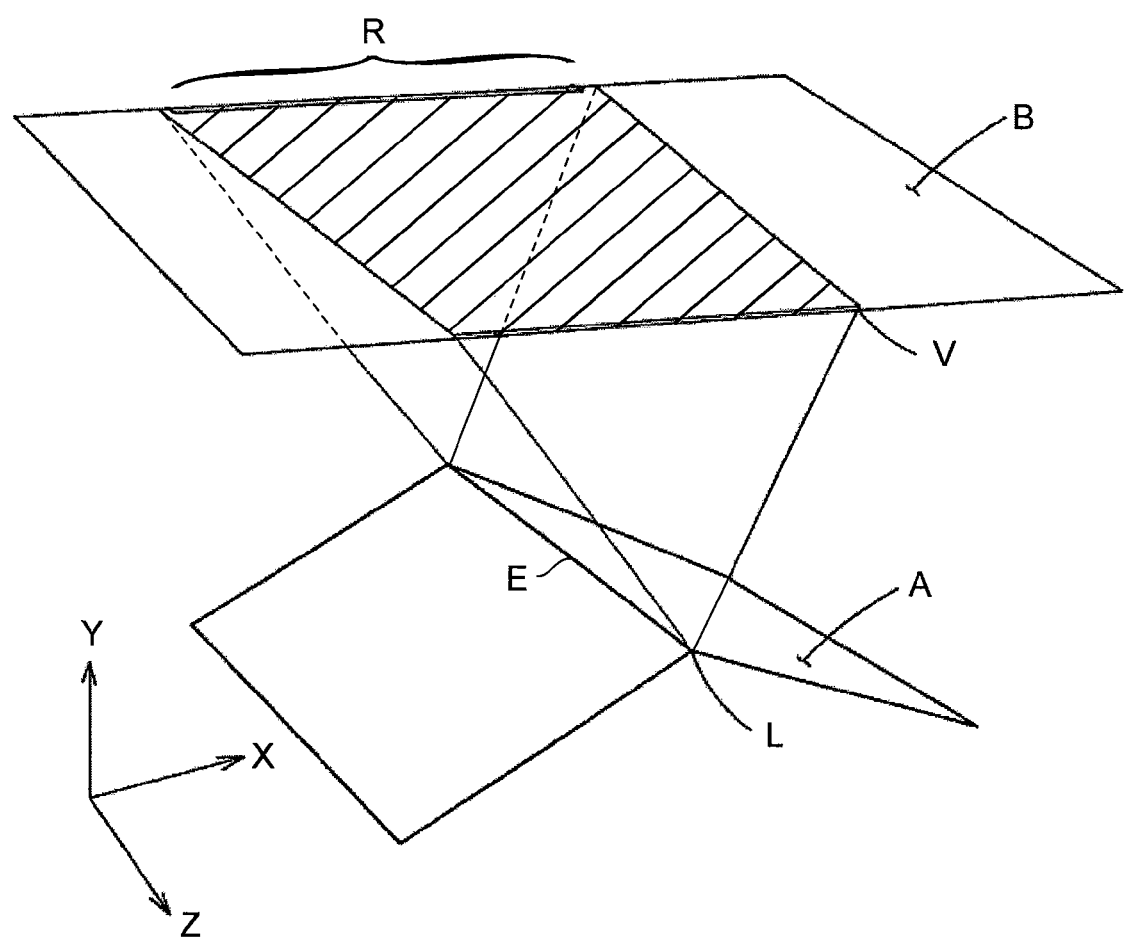
FIG. 2 is a diagram illustrating an example of distortion due to derivation of a closest surface relationship.

Generally, for each target vertex, the closest source surface location is determined in the following way. Referring to FIG. 2, the closest surface point from a geometric surface A to a vertex V of a surface B positioned at a 3D position P(V) is, among all possible surface points in A (either on a vertex, on an edge, or inside a face), the surface location L at a 3D position P(L) that minimizes the Euclidean distance between P(V) and P(L). Notice that this relation in not symmetrical; if L is the closest surface location on a surface A from surface B's vertex V, vertex V is not, in general, the closest surface location on the surface B from location L. It is possible, though unlikely in general, for many surface locations on surface A to correspond to the same vertex of surface B. Since the closest surface search is well-defined, its results do not depend on its implementation. Because it involves a search, recursive space partitioning would be part of an efficient implementation. Identifying the closest source vertex instead of the closest source surface location involves similar computations.

Distortions may be introduced by determining the closest surface or closest vertex in this manner if a non-null area of a target surface corresponds to a convex edge or a convex vertex. The more the convexity is pronounced, and the farther the target surface is from the edge or the vertex, the greater the size of this non-null area of the target surface will be. As shown in FIG. 2, all of the points in region R of the target surface B correspond to the edge E in the source surface A. If the variation in, i.e., the derivative of, the attribute values over the source primitive around the convex edge or vertex is non-null, then a resulting lack of variation over the target region R that corresponds to the source convex edge or vertex produces a significant visible artifact. Such an artifact is particularly likely to occur when transferring attributes from a low resolution mesh to a high resolution mesh. In this scenario the vertex density is higher on the target surface, which increases the probability that many adjacent target vertices are close to the same source convex edge or vertex.

A symmetrical problem occurs with concavities. No area of a target surface placed above a concave edge or a concave vertex in the source surface corresponds to face portions of the source surface adjacent to this edge or vertex. The more the concavity is pronounced, and the farther the target surface is from the concave edge or the vertex, the greater the non-covered area of the source geometries will be. In such a case, if the variation in, i.e., the derivative of, the attribute values over the source primitive around the concave edge or vertex is non-null, then a discontinuity will arise in the attributes on the target surface due to non-coverage of some of the source geometry. Such an artifact also is likely to occur when transferring from a low resolution mesh to a high resolution mesh, for reasons similar to the case of convexities.

To reduce distortions caused by concave or convex edges or vertices, the closest surface and closest vertex locations may be locally redistributed to provide a more uniform coverage of the problematic source edges. Given the actual closest surface (or vertex) location in the source, topological information, e.g., connectivity between the faces, vertices and edges, triangulated representation of the polygons, and positional information, e.g., vertex positions, vertex normal values, about the adjacent faces surrounding that location is gathered. For example, such information may be gathered about the face, edge or vertex identified, and from one ring of adjacent faces. Based on this information, a correspondence or remapping function is applied locally which either does not produce the undesired distortion or reverts it. Thus, a globally applied correspondence or remapping function is applied and then refined locally using another correspondence or remapping function.

Figure 3:
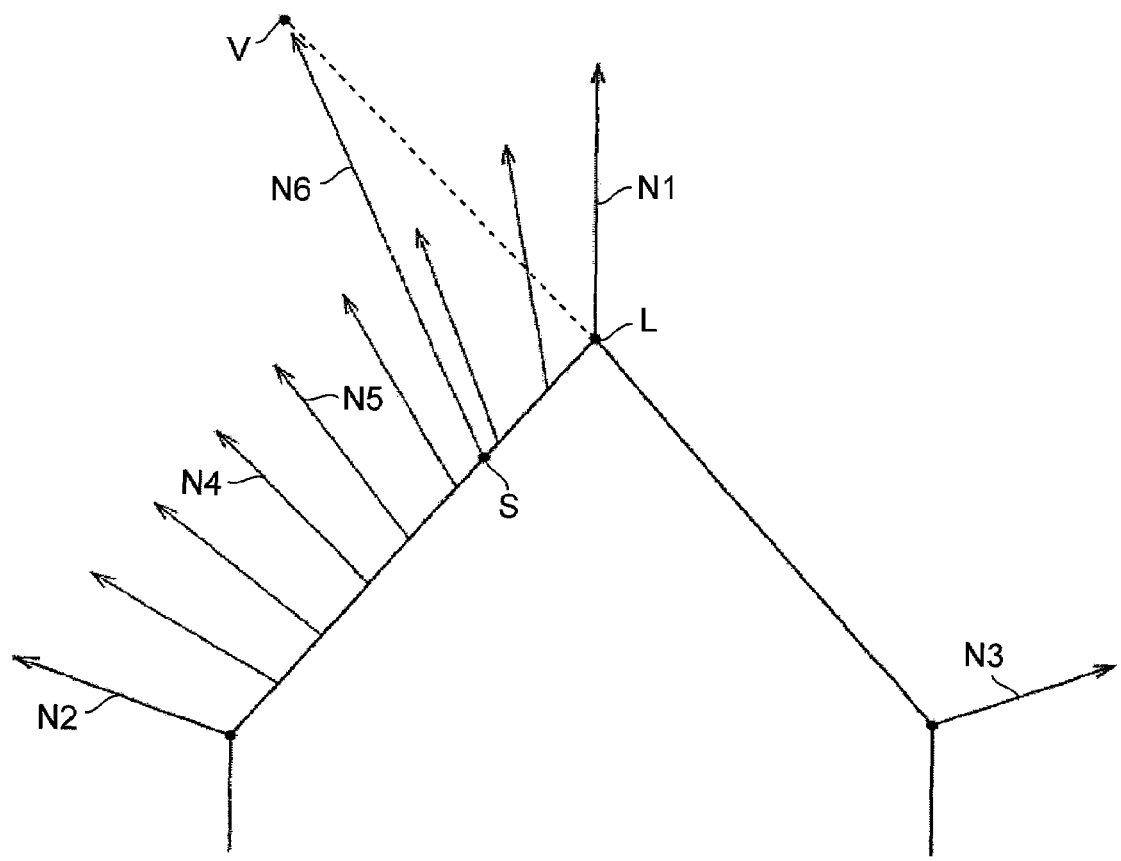
FIG. 3 is a diagram illustrating an inverse raycast technique for determining correspondence between the source and target geometries.

One function, described in connection with FIG. 3, for refining the correspondence to achieve this result is an inverse ray-casting function. FIG. 3 represents a two-dimensional (2D) simplification of the problem, such that the source geometry is made of connected line segments instead of connected triangles. First, a first set of faces is built, including all faces adjacent to source geometry's component (face, edge or vertex), e.g., vertex L, corresponding to the target vertex V. A second set of faces is built by including all source faces that are adjacent those in the first set. Thus the second set includes the first set. From the second set, a set of triangles is built from the tessellation of the faces in the second set. For each triangle in the set of triangles, vertex normals (N1, N2, N3) are computed. These vertex normals are interpolated over the local adjacent faces to produce interpolated face normals (e.g., N4, N5, N6). A source surface location S can be identified from the triangle such that a line starting from S and going in the direction of its interpolated face normal N6 passes by the target vertex V. The closest surface location for the target vertex V is set to this point S. If no such S exists, then we continue with another triangle of the set of triangles. In the rare case that no line passing through an interpolated source face normal reaches the target vertex, the original source geometry's component (e.g., vertex L) corresponding to that target vertex is kept and a closest surface location is determined based on that component.

In many cases, the volume defined by the lines passing through the interpolated normals of the local adjacent faces will include the target vertex V. Moreover, because the normals N1 and N2 defined at the vertices are interpolated along the faces to produce different vectors, these interpolated normals often define a one-to-one correspondence with the positions within that volume. This correspondence provides a uniform mapping from the target vertices to the source faces and their attribute variations even in concave and convex areas.

Figure 4:
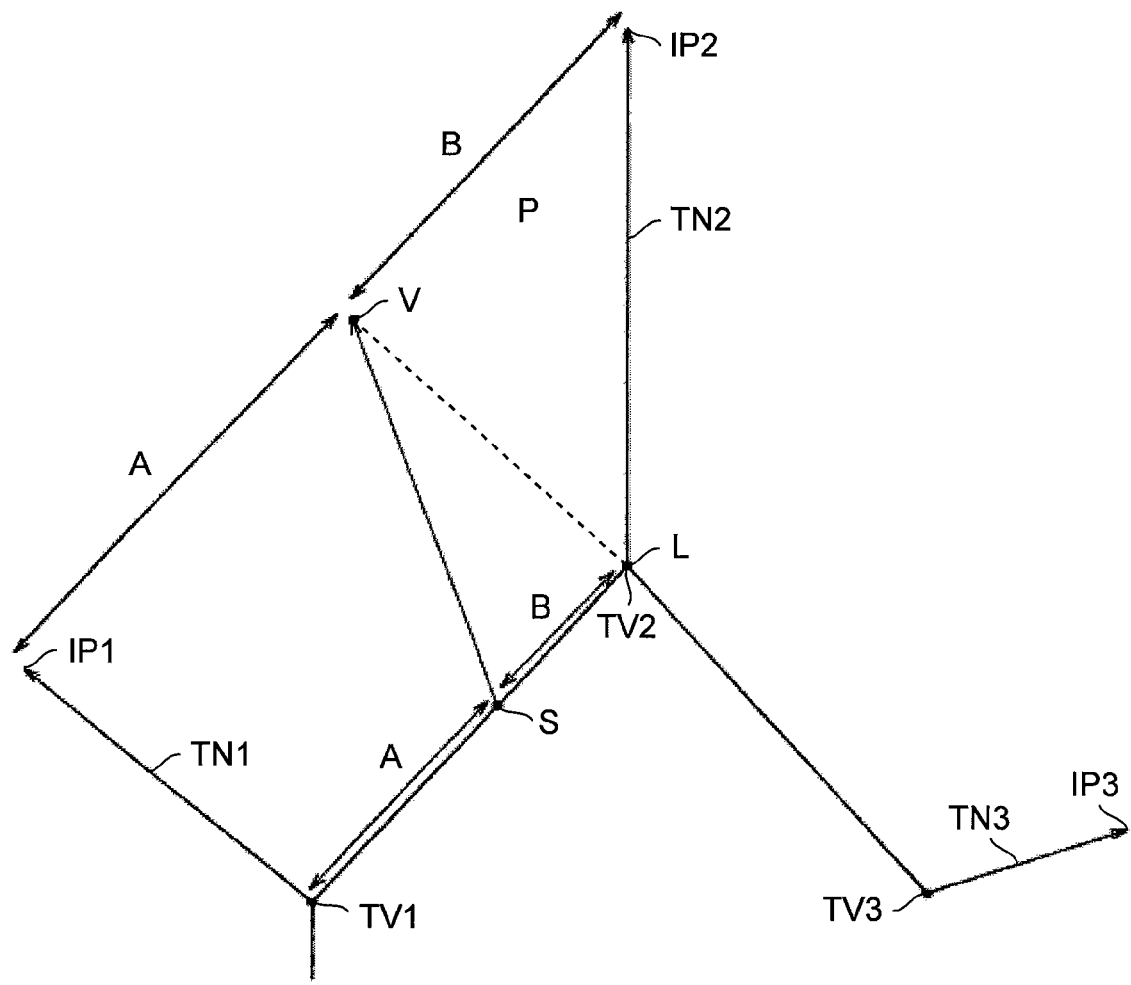
FIG. 4 is a diagram illustrating another inverse raycast technique for determining correspondence between the source and target geometries.

A variation of the inverse ray-casting function will now be described in connection with FIG. 4. FIG. 4 represents a 2D simplification of the problem, such that the source geometry is made of connected line segments instead of connected triangles. Barycentric coordinates for a line segment are made of two values, A and B in FIG. 4, which would become three values for a 3D triangle, with a barycentric coordinate for each triangle vertex. This method starts from the same set of triangles that was defined for the inverse ray-casting method described above in connection with FIG. 3. For each triangle in the set of triangles, a plane P is identified which is parallel to the triangle and passes through the target vertex V. Then, for each vertex (TV1, TV2, TV3) of the triangle and its corresponding normal (TN1, TN2 and TN3), the intersection point (IP1, IP2, IP3) between the plane P and the line passing through the vertex TVi in the direction of its corresponding normal TNi is determined. The barycentric weights of the target vertex V relative to the intersection points IP1, IP2 and IP3 is then determined. If the target vertex V is not included in the triangle IP1-IP2-IP3, then we continue with another triangle of the set of triangles. Otherwise, these barycentric weights are then applied with respect to the source vertices (TV1, TV2 and TV3) to define a source surface location S. In the rare case that no source surface location S can be identified, the source geometry component (e.g., vertex L) originally identified as corresponding to that target vertex is kept.

A variation of the inverse ray-casting function will now be described in connection with FIG. 4. FIG. 4 represents a 2D simplification of the problem, such that the source geometry is made of connected line segments instead of connected triangles. Barycentric coordinates for a line segment are made of two values, A and B in FIG. 4, which would become three values for a 3D triangle, with a barycentric coordinate for each triangle vertex. This method starts from the same triangle set S3 that was defined for the inverse ray-casting method described above in connection with FIG. 3. For each triangle T in the set S3, a plane P is identified which is parallel to the triangle T and passes through the target vertex V. Then, for each vertex (TV1, TV2, TV3) of the triangle T and its corresponding normal (TN1, TN2 and TN3), the intersection point (IP1, IP2, IP3) between the plane P and the line passing through the vertex TVi in the direction of its corresponding normal TNi is determined. The barycentric weights of the target vertex V relative to the intersection points IP1, IP2 and IP3 is then determined. If the target vertex V is not included in the triangle IP1-IP2-IP3, then we continue with another triangle of the set S3. Otherwise, these barycentric weights are then applied with respect to the source vertices (TV1, TV2 and TV3) to define a source surface location S. In the rare case that no source surface location S can be identified, the source geometry component (e.g., vertex L) originally identified as corresponding to that target vertex is kept.

For an even more robust quality of transfer, multiple correspondences can be recorded using different correspondence techniques if a target vertex corresponds to many overlapping source surface locations. A user-provided threshold can define the distance (usually small) which defines if two vertices overlap.

Having now described several methods for computing the correspondences between each target vertex and the source geometry, how these correspondences (108 in FIG. 1) are used to preserve discontinuities in transferring the attributes of the source geometry to the target geometry will now be described.

Attribute discontinuities that must be preserved on the target geometry can have various origins. In most cases, they come from attribute discontinuities that were present in the source geometries and have a correspondence to the target geometry. As an example, a source surface may have two colors, red and blue, and each face is either red or blue. The edges that are adjacent to red and blue faces are discontinuous.

In other cases, a discontinuity is caused by a topological or geometrical mismatch between the sources and the target geometries. For example, if one were to transfer colors from two adjacent spheres, a blue and a red one, to a bigger target sphere containing the spheres, there will be some edges on the target sphere such that one of its vertices correspond to the red sphere and the other one corresponds to the blue sphere. Since there is no color interpolation between the colors of the source spheres, this topological mismatch should be preserved as a color discontinuity on the target geometry.

The same type of discontinuity, due to a mismatch between source and target geometries, would occur even if the source geometry has only one piece and no discontinuities. An example could be an open torus shape (C shape) with a red and a blue pole, the red being interpolated to blue along the torus. If the color were transferred from this torus to a closed torus (O shape), there will be some edges on the target mesh such that one point corresponds to the red pole and the other corresponds to the blue pole. Again, this mismatch should be preserved as a discontinuity, because even if the source primitive does not have a discontinuity, the propagation of the attribute to the surrounding volume through the closest surface relationship defines a clear discontinuity in that volume.

Face attributes, such as materials, can define property discontinuities too. However these can be treated in the same way as discontinuities at edges by considering the edges defining the contour of the connected faces having a specific attribute.

To assist the explanation of the discontinuity preservation techniques, several concepts will first be explained. An edge is called a discontinuous edge if there is a discontinuity in the attributes between the faces adjacent the edge. A graph may be defined to connect sets of discontinuous edges. Such graphs define discontinuous paths on the source geometries. These discontinuous paths often enclose connected regions of the geometry. However, in general, discontinuous paths can be open. An example of an open discontinuous path is a single discontinuous edge in the middle of a plane. Discontinuous paths can intersect. Such intersections occur at source vertices that are adjacent to three or more discontinuous edges.

For an edge that is adjacent to two faces, a "half edge" is one side of this edge. Thus, an edge has two half edges, one on face A and one on face B. A discontinuity circuit is a circuit of connected discontinuous edge's half edges such that all the consecutive face corners along this path have no attribute discontinuity. For all attribute discontinuities defined on a source geometry, a set of discontinuity circuits that describe all discontinuities can always be defined. Discontinuity circuits are always closed. It is possible for a discontinuity circuit to contain both half-edges of an edge.

The correspondence of a discontinuity circuit (or a portion of it) from the source geometry on the target surface is its "projection" onto the target surface. Because the surface correspondence between the source and target geometries is not a one-to-one relationship, it is possible for a discontinuity circuit (or a portion of it) to be projected at various target surface locations. Moreover, because there is no guarantee about the quality of the surface correspondence, the projected circuit can cross itself, can represent only a portion of a source circuit, and can even be reverted or partially reverted relative to its source counterpart. For example, projecting a linear circuit onto a sphere creates a circle on that sphere.

The following method preserves the discontinuity types discussed above, and provides good results even with ill-defined or distorted projected circuits. Thus, this method focuses more on preserving discontinuities in source attributes than discontinuities caused by a topological or geometrical mismatch.

Figure 5:
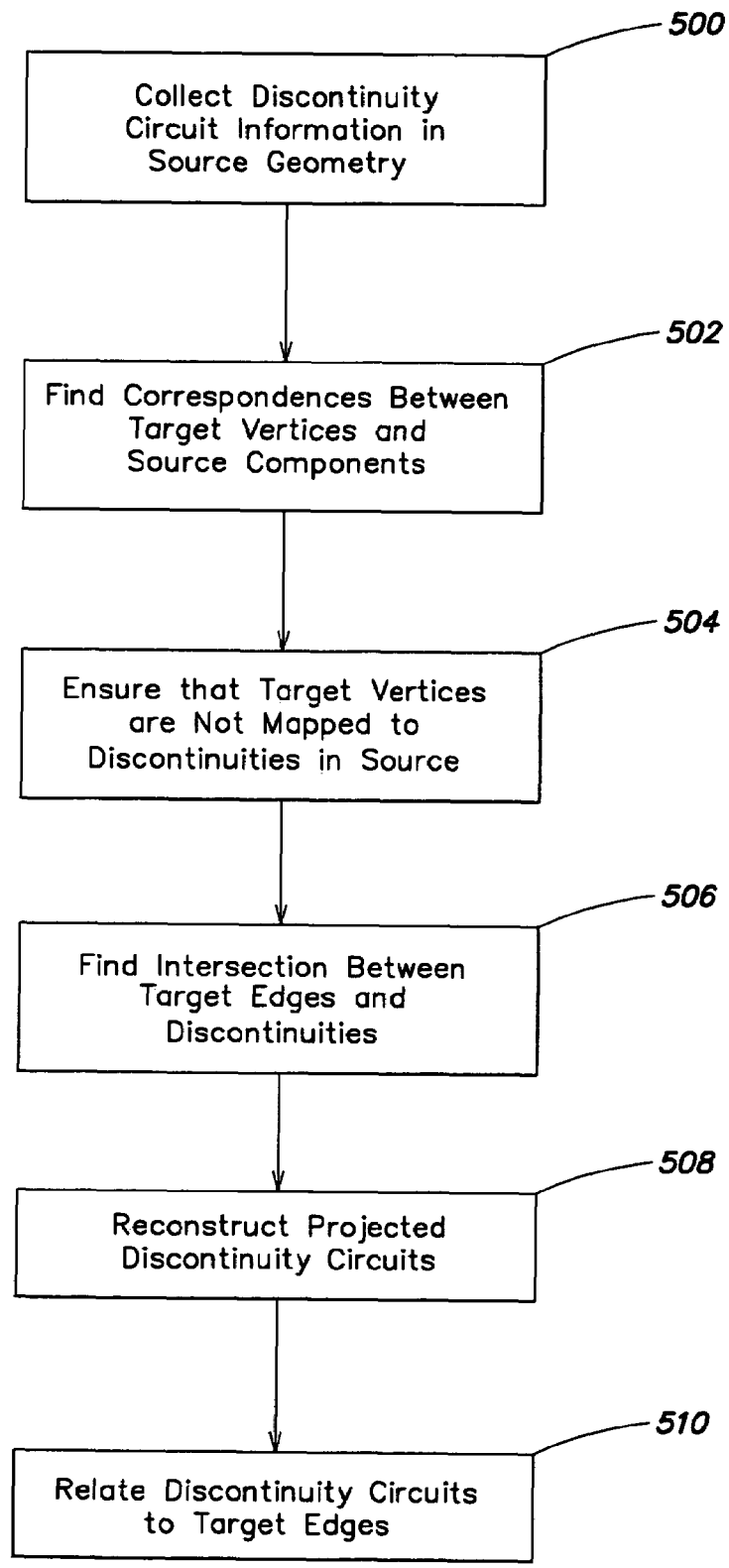
FIG. 5 is a flow chart describing an example method for preserving discontinuities.

Referring now to FIG. 5, an overview of the steps of the discontinuity preservation algorithm is provided. On the source geometry, the discontinuity circuits are identified and information about the source attributes is collected in step 500. The correspondences between the target vertices and source surfaces is obtained in step 502. In step 504, these correspondences are processed to ensure that target vertices are not mapped to discontinuities in the source surface. Step 500 can be done separately from steps 502 and 504, whether in parallel or in a different order. The intersections between the target edges and the discontinuity circuits are then determined in step 506. The projected discontinuity circuits are then reconstructed in step 508. The discontinuity circuits are then related to target edges in step 510. These steps will now be described in more detail.

Figure 6:
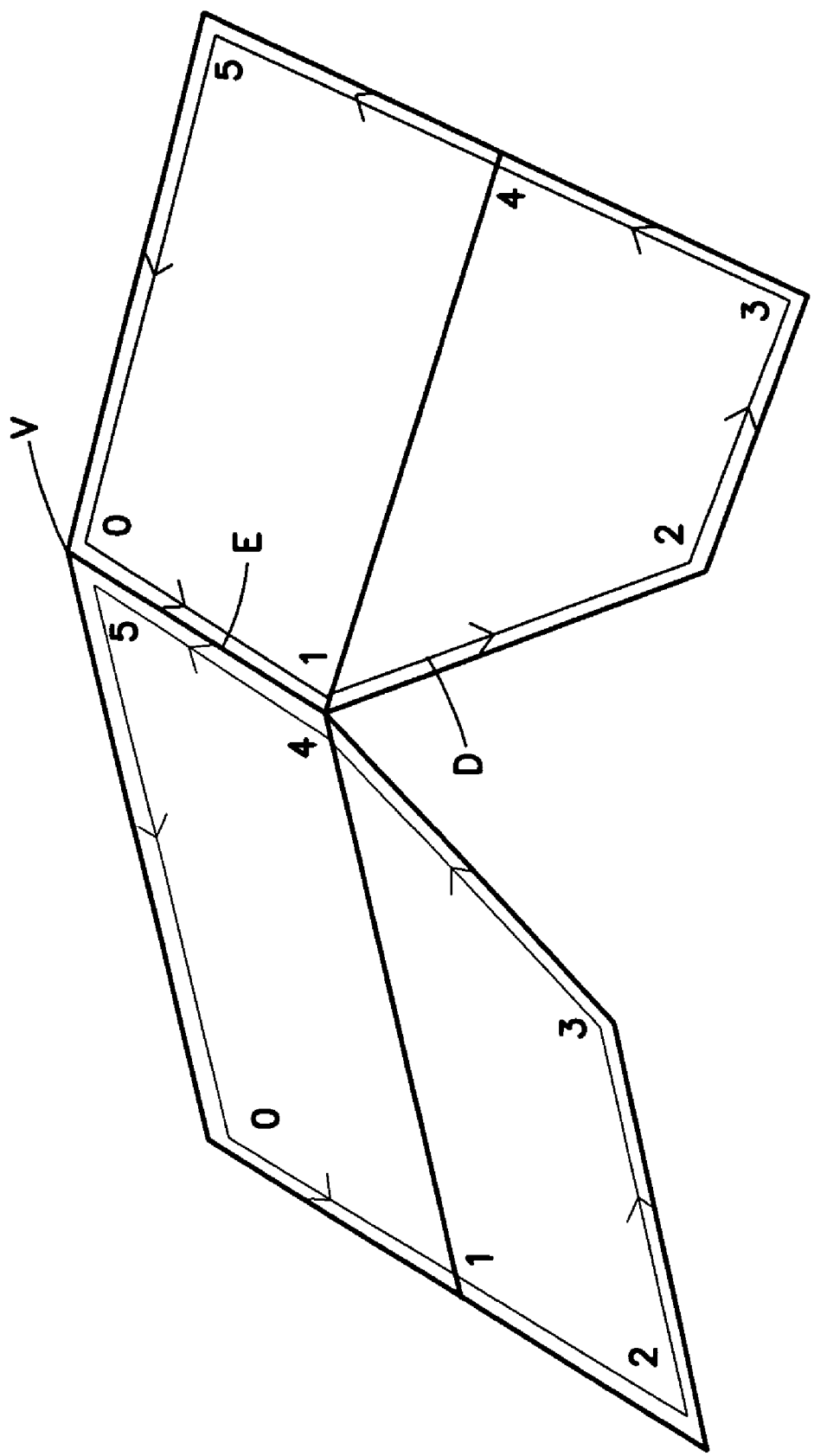
FIG. 6 is a diagram illustrating the collection of discontinuity circuit information.

For step 500, referring to FIG. 6, discontinuity circuits in the source geometry are identified and information about them is gathered. The discontinuity circuits are defined by identifying all discontinuous half edges, such as edge E. A vertex of a discontinuous half edge is selected, such as vertex V, and the discontinuity circuit D including it is created by traversing the source geometry. The source geometry is traversed along all discontinuous half edges until an extensive list of the discontinuity circuits is created. Each discontinuity circuit is numbered, and an ordered list of the half edges it includes is created. For each discontinuity circuit, the half edges are numbered, such as shown in FIG. 6, and their edge orientation relative to the circuit order is recorded.

Various methods for determining the correspondences between the source and target geometries are described above in connection with FIGS. 2-4 and can be used to perform step 502.

Figure 7:
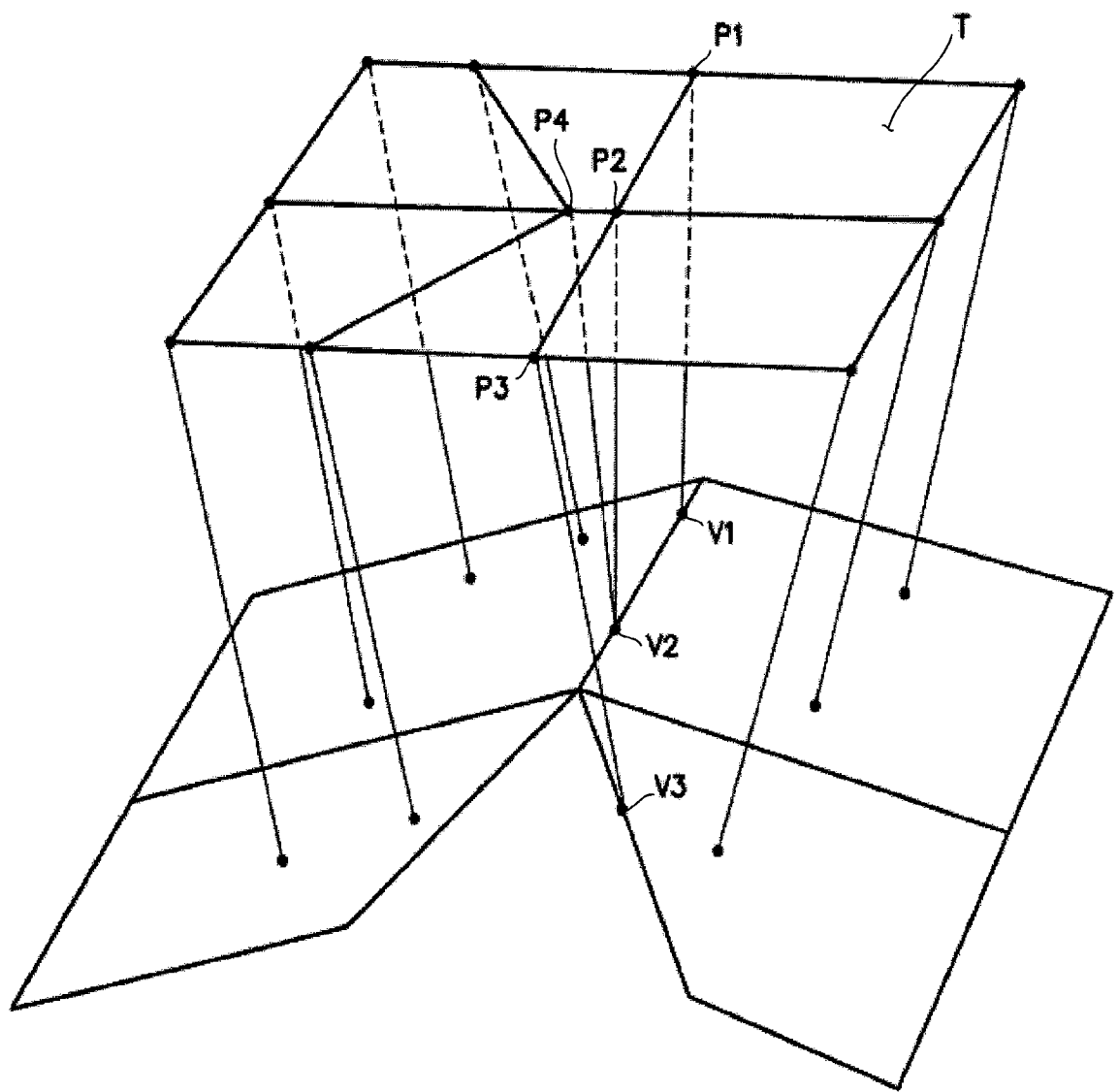
FIG. 7 is a diagram illustrating the determination of source and target correspondence.

Regardless of the implementation of the correspondence calculator (106 in FIG. 1 as used in step 502 of FIG. 5), many adjacent target vertices can correspond to the same source convex edge, such as shown in FIG. 7. In particular, points P1, P2, P3 and P4 in the target surface T all are mapped to points on the path containing points V1, V2 and V3. Points P1, P2 and P4 all are mapped to points on the same edge containing V1 and V2. The fact that the same portion of a source discontinuity circuit can correspond to a target region that can be larger than the width of one or many target polygons can prevent the next steps of the algorithm from preserving the source discontinuities properly. The algorithm requires that each portion of a projected discontinuity circuit fit into a path of connected adjacent target polygons, which has a width of at most one polygon.

Figure 8:
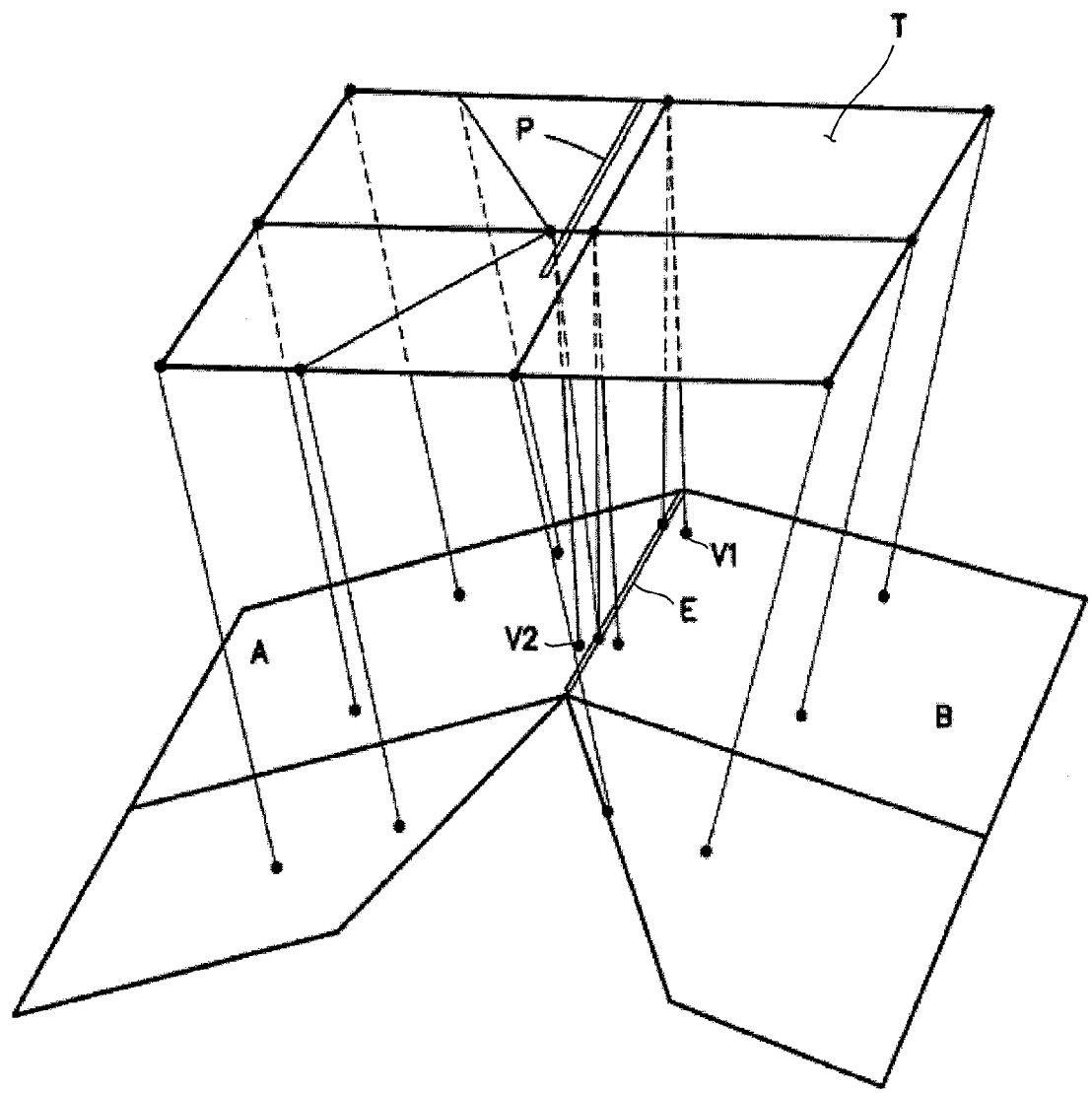
FIG. 8 is a diagram illustrating the avoidance of exact correspondence with discontinuous edges.

Referring to FIG. 8, a method is applied in order to reduce the width of the target polygon path corresponding to a projected discontinuity circuit. This method applies a microdisplacement to the surface locations so they no longer fall exactly on a discontinuity edge (step 504 in FIG. 5). This step is optional when using an inverse ray casting method or other method for determining the correspondences that otherwise reduces distortion in the mapping of the source surface to the target surface, but may nonetheless be applied to reduce the number of correspondences that fall on edges in the source geometry. To determine on which adjacent face of the discontinuity edge a surface location should be moved, a plane P is defined. Plane P is a bisector plane passing through the source discontinuous edge E and forming equal angles with the planes passing through faces A and B adjacent to the edge E. If the target vertex is on the same side relative to plane P as the face A, then the source location corresponding to the target vertex will be displaced onto the face A, such as shown at V2. If the target vertex is on the same side relative to plane P as the face B, then the source location corresponding to the target vertex will be displaced onto the face B, such as shown at V1. If the target vertex happens to be directly on the plane P, then its corresponding source location is kept on the discontinuous edge.

Figure 9:
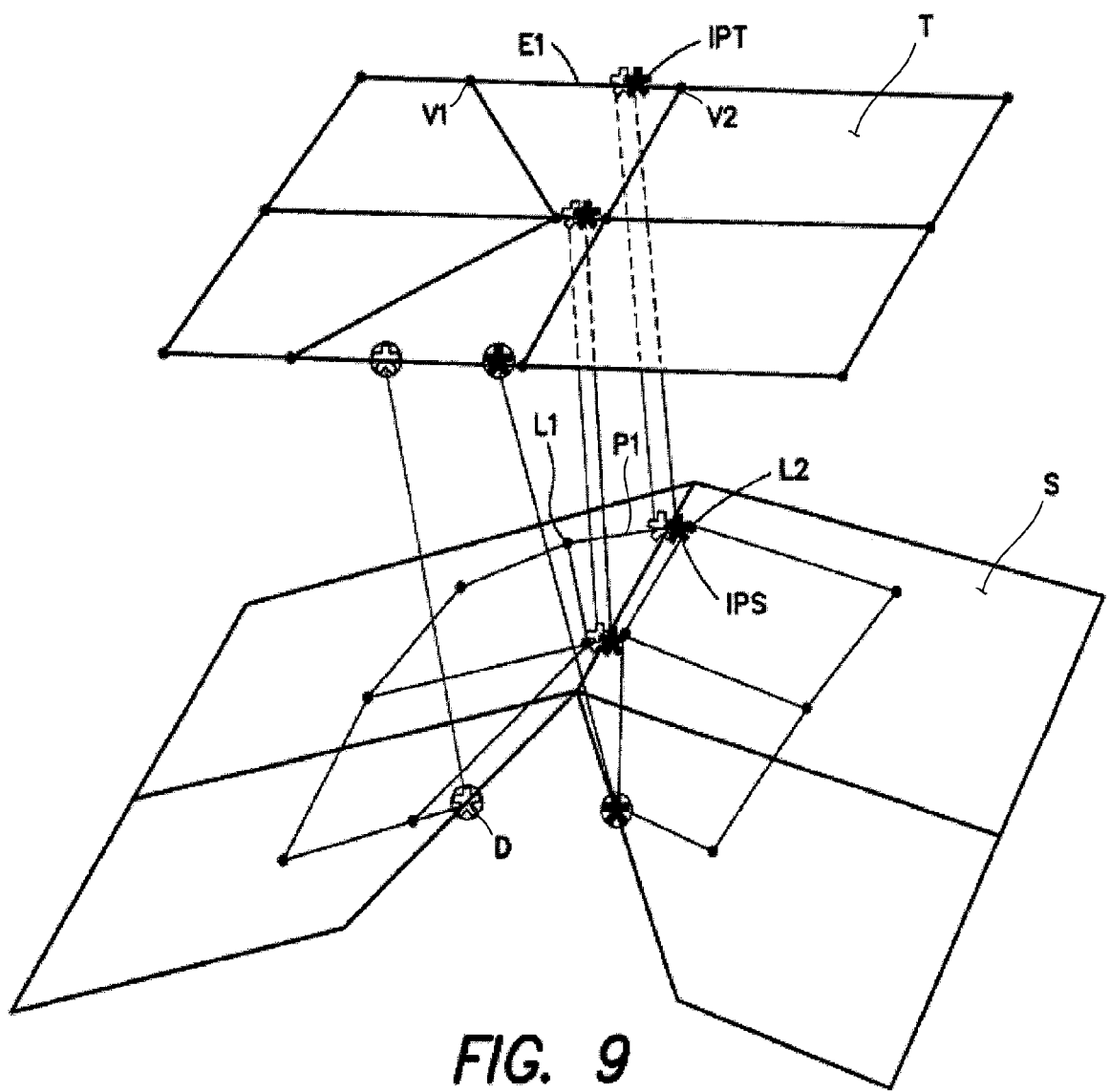
FIG. 9 is a diagram illustrating the identification of intersections with attribute discontinuities.

Referring now to FIG. 9, the intersections of the discontinuity circuits with edges in the target geometry are then determined. To find these intersections, conceptually, the correspondence of the target edges with the source surface is determined. For example, the edge E1 in the target surface T corresponds to a path P1 on the source surface S. What is needed is to determine the intersection point IPT on the target edge E1 which corresponds to the intersection point IPS on path P1 that intersects the discontinuity circuit on the surface S. This determination does not involve a projection, because projection is not a bidirectional relationship. Therefore, the process begins by identifying a short path linking source surface locations L1 and L2 corresponding to the vertices V1 and V2 of the target edge E1.

Various methods can be used to find point IPS, such as traversing the source geometry in straight line, finding the actual shortest path between locations L1 and L2 (which is more computationally expensive), or traversing the source geometry along the intersection between the source surface and a plane which is perpendicular to the surface and which passes through the two surface locations L1 and L2.

If a short path linking the two source locations L1 and L2 exists, then, by using the description of the path and the information collected (as described in connection with FIG. 6, all the intersections between the path and the source circuit half edges are recorded. For each intersection, various information is stored, such as the target edge, the intersection position along the target edge path (from 0 to 1), the source circuit, and the position on the half edge (from 0 to 1) and in the source circuit. If many overlapping source surface locations correspond to a target vertex, the paths between all combinations of the corresponding overlapping source locations corresponding to target edge's end vertices should be tried, and the best ones should be kept.

If a short path linking the two surface locations does not exist, the target edge is recorded as part of a geometrically (or topologically) discontinuous intersection. More precisely, a short path will not be found if the surface locations L1 and L2 are on different source primitives, or if the path encounters a topological discontinuity, e.g., a surface boundary such as at D, or if the path linking the two surface locations is too long relative to some threshold. An example maximum path length threshold may be 3 times the distance between the two source surface locations, but can be made a user defined parameter. Two distinct intersections are defined and recorded in this case. Starting from each target edge extremity, the farthest edge location is identified such that a short path exists between the source surface location corresponding to the target edge extremity and the source surface location corresponding to that edge location. The farthest edge location for each edge extremity, along with their corresponding source surface locations, are recorded as a geometrical discontinuity intersection.

The result of this step described in connection with FIG. 9 is a list of the intersections.

Figure 10:
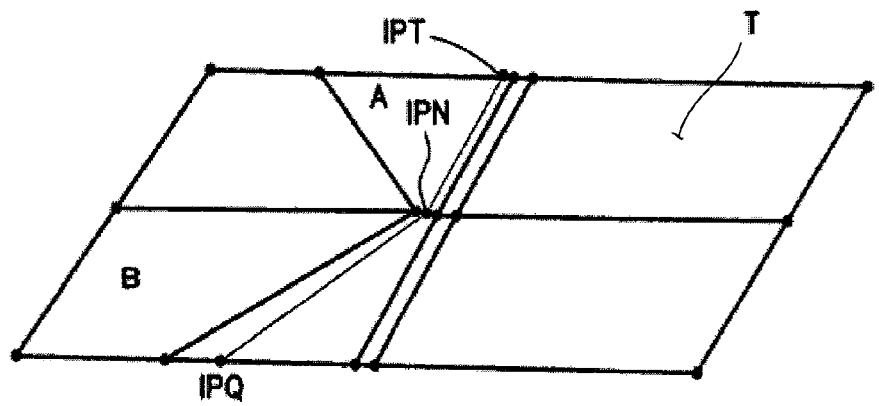
FIG. 10 is a diagram illustrating the reconstruction of projected discontinuity circuits.
Figure 10:
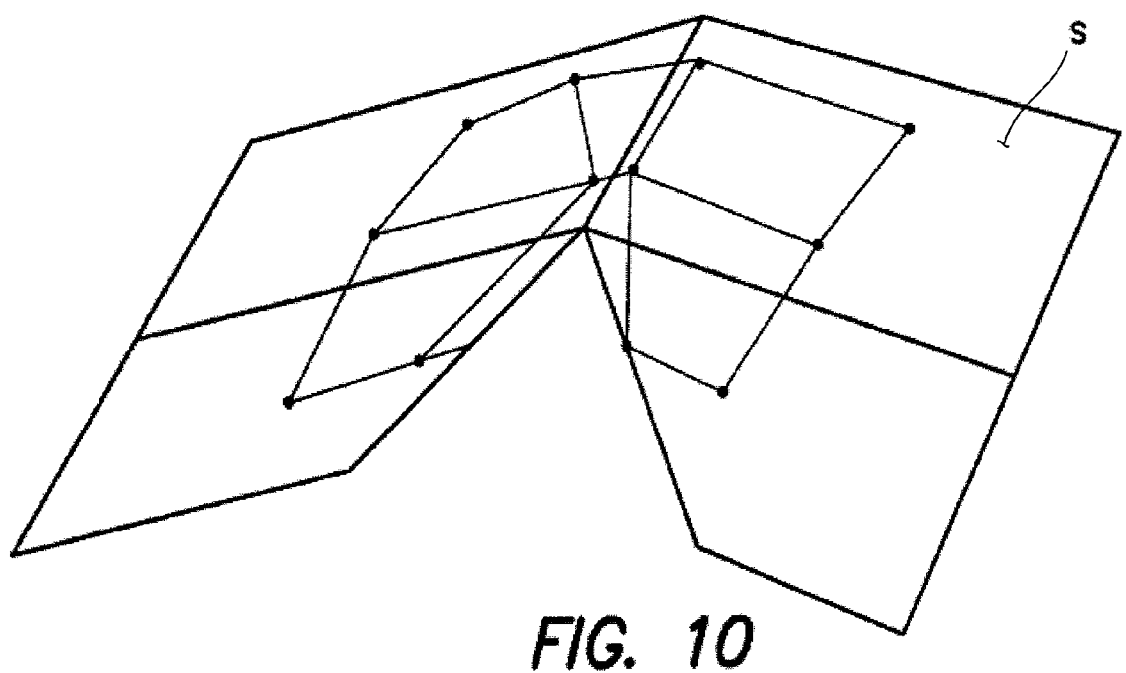

Referring now to FIG. 10, the set of intersections is used to build the projected discontinuity circuits on the target surface. Starting with a target edge intersection that has not yet been processed, such as IPT, this intersection is recorded as the first element of a new intersection list, and is placed in a processed intersections set. Then, among all edges adjacent to the faces adjacent to the target edge of the current intersection, an intersection of the same type which has not been processed and which is the closest to the current one in term of order within the source circuit is identified (e.g., IPN). Two intersections are of a same type if they are part of a same source circuit or if they have both been marked as being a geometrical (or topological) discontinuity. This intersection is added to the intersection list and to the processed list, along with the target face which is linking this intersection to the previous one, e.g., face A. By tracking the target faces, a polygon stripe surrounding the projected discontinuity circuit is defined. The process continues to identify adjacent intersections (e.g., IPQ on face B) of the same type until there are no more compatible intersections.

Figure 11:
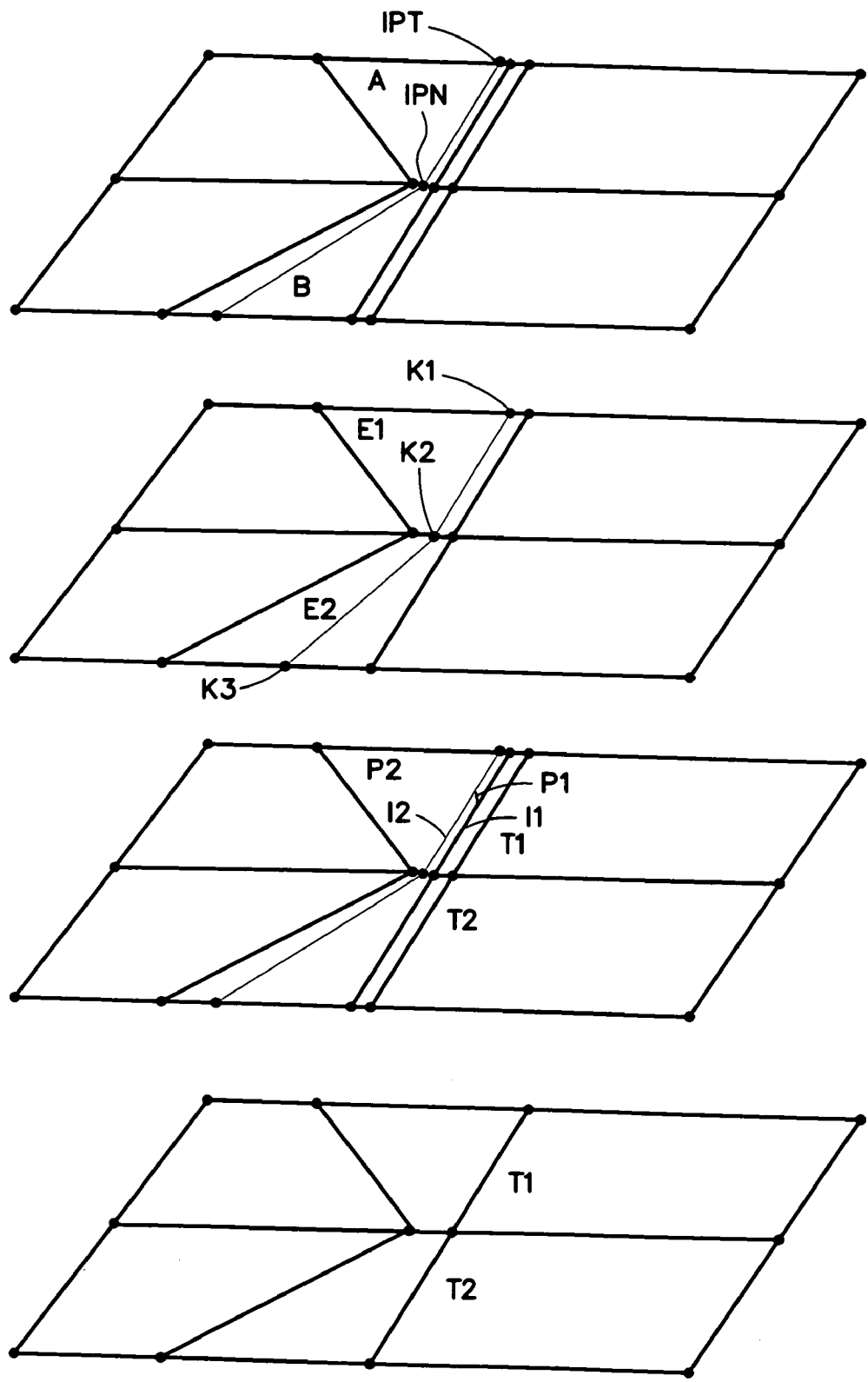
FIG. 11 is a diagram illustrating the correspondence of discontinuity circuits to target edges.

Finally, the projected circuits are related to the target geometry edges, as will now be described in connection with FIG. 11. One way to create this relationship is to topologically create edges on the target geometry. Another way is to find the target edge path which is the best fit for the projected circuit path location. The way used can be a user defined parameter.

Topologically creating edges on the target geometry is performed using the information recorded in the previous steps. Of course, if the topology of the target mesh fits exactly with the projected circuit, no topological change is required. Otherwise, for all projected circuit lists, vertices on the target mesh are created by splitting the target edges at their intersection ratio, such as shown at K1-K3. Then, all the projected circuit vertices are linked by creating edges, e.g., edges E1 and E2, also called splitting faces, and linking them in projected circuit order. In the case of intersections of three or more circuits, an inner face point corresponding to the circuit intersection location is created and connected to all intersections of surrounding target edges. In other words, each face in the polygon stripe defined by a projected circuit is split at the midpoint between the projected circuit and the adjacent projected circuit.

The property values of the related source discontinuity values are then copied. In the case of intersections with source discontinuity circuits, the property values are the ones along the circuit at the intersection location with the target edge path. In the case of geometrical discontinuities, these values are the ones corresponding to the farthest edge locations on the proper projected circuit side.

Determining the target edge path which is the best fit relative to the projected circuit begins by generating, for each target geometry faces, a list of all projected circuit intersections which are passing through the face, e.g., edges I1 and I2, is generated. In general, each projected circuit portion intersecting the target face will intersect it at two locations. Different portions of the same circuit can intersect a face. The various circuit portions define two or more partitions of the target polygon, e.g., areas P1 and P2. It is then determined which partition of the target polygon has the biggest area. This area can either be computed in the target surface or in the corresponding source surface. For simplicity, our implementation computes the area of the portion in source surface space. This area is computed as the area of the polygon formed by the source edges of the circuit portion, the intersection points between the source discontinuity circuit and the path corresponding to the target edge on the source surface, and the source surface locations corresponding to the vertices of the target polygons included in the partition. The circuit portions which are part of the biggest polygon partition, e.g., P1, will be marked so they are later snapped to the interior half edges of the target face. The other circuits will be marked so they are later snapped to the exterior half edges of the target face. In the example shown in FIG. 11, this would mean that I1 and I2 are snapped to T1 and T2.

Then, each projected discontinuity circuit is processed in order to find a corresponding target edge circuit. The ordered face stripe corresponding to a projected discontinuity circuit is already known from the information recorded in prior steps. However, a face stripe can define multiple possible edge paths. This ambiguity is resolved by the information collected previously, which states if circuit portions should correspond to the inner or the outer half edges of each target face.

Finally, the attribute values from source circuits are propagated to the corresponding target edge circuits. In order to minimize the distortion caused by the difference in shape between the target edge circuit and the projected source circuit, the closest circuit property value is copied to the target components. For each target face corner on which the discontinuity has to be propagated, the closest circuit location is found in source geometry's space, relative to the surface location corresponding to the target vertex. The closest circuit location is searched among the circuit portions being projected to the adjacent target polygons.

Various variations over this algorithm can be used in order to preserve attribute discontinuities on the target primitive.

For example, to create a description of the projected circuit on the target geometry, another possible method is to first find a starting point of the projected circuit onto the target geometry, and then define the circuit trajectory on the target surface by walking in parallel on the source and the target geometry. The correspondence between the source circuit and the target projected circuit could be determined by various methods such as by using a spatial correspondence method mapping from the source to the target, or by localizing the source circuit positions relatively to the source surface locations corresponding to the target vertices (e.g., by using barycentric coordinates).

All source discontinuity edges could be treated as surface boundaries (topological discontinuities). Methods similar to the ones used to preserve the geometrical (or topological) discontinuities then may be applied. In this case, it would not be necessary to collect information about the discontinuity circuits; however, the attribute discontinuities around the discontinuous edges would, in effect, be preserved only locally.

In the case of texture coordinate discontinuity preservation, and similar vector attributes, instead of applying the method described in connection with FIG. 9, circuit intersections could be found directly in the property space. A target edge corresponds to some source locations, and these locations have some precise UV values, where a UV value is a Cartesian coordinate pair in the surface attribute plan. This correspondence gives to a target edge a corresponding UV segment in UV space. This segment can then be tested for intersections with source geometry's discontinuous edges' corresponding UV segments.

A less robust method, which could replace the steps of FIG. 5, is to use a reverse correspondence relationship. Instead of finding a target geometry's corresponding locations on the source geometries, the target geometry's surface locations corresponding to source geometries' vertices could be found. In this context, it is more complex to define the property values for target geometry's components. A way could be to use some barycentric coordinates relatively to the surrounding target surface locations corresponding to source geometies' vertices. However an advantage is that the location of source geometries' discontinuity circuits on the target primitive is given directly by the correspondence relationship. But in general, such an inverse relationship can give bad results, since many source geometries' surface location can correspond to a same target vertex, and some target vertices may correspond to no source geometries' surface location.

Such attribute transfer is useful in a number of ways for creating three-dimensional assets for both game and film markets.

For example, such attribute transfer can greatly increase productivity for artists who create a game or film three-dimensional asset, such as a character, at different resolutions (such as a high resolution, low resolution or in between). Depending on the workflow followed and the tools used, the artist may first define attributes at one resolution and then propagate the attributes from that resolution to other resolutions. Often, the attributes of the low resolution will first be defined, since it represents less work for the artist to define properly the attributes on simpler geometries.

Additionally, such attribute transfers can greatly increase productivity for artists who create different game of film three-dimensional assets, such as different characters, at similar resolutions and with similar attributes. An example in the game industry is to create various characters that must all implement a precise collection of base actions required by a game engine, such as deformation weights, expression and phoneme shapes. An example in the film industry is to create various characters that populate a crowd. Even if they have different shapes and topologies, all characters must have proper surface attributes for rendering and animation purposes, such as actions to yell, applause, walk, etc.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. For example, the components 106 and 110 shown in FIG. 1 may be separate modules of a computer program, or may be separate computer programs, which may be operable on separate computers. In an object-oriented system, these modules may represent method that may be performed on a mesh or other object for which they are defined. These modules, or a part of these, could be used within a more complex process which would include some polygon reduction processing as a part of its internal steps. These modules, or some of them, also may support customization through a plug-in architecture. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for transferring attributes from a first three-dimensional mesh to a second three-dimensional mesh, wherein each of the first and second three-dimensional meshes includes a plurality of vertices and a plurality of edges interconnecting the vertices and defining surfaces, the method comprising:

determining correspondences between vertices included in the second three-dimensional mesh and surfaces included in the first three-dimensional mesh;

modifying at least one correspondence by applying a remapping function to modify a surface location in the first three-dimensional mesh associated with the at least one correspondence, wherein the remapping function implements an inverse ray-casting technique to identify the surface location based on locating, on the first three-dimensional mesh, a point where an interpolated face normal passes through a vertex in the second three-dimensional mesh associated with the at least one correspondence;

identifying discontinuous edges in the first three-dimensional mesh, wherein each discontinuous edge is associated with a surface attribute discontinuity defined by a variation of an attribute value across the discontinuous edge;

relating the discontinuous edges with the second three-dimensional mesh; and transferring attribute discontinuities from the first three-dimensional mesh to the second three-dimensional mesh based on the correspondences between the vertices included in the second three-dimensional mesh and the surfaces included in the first three-dimensional mesh and the relation between the discontinuous edges and the second three-dimensional mesh;

storing the attribute discontinuities in a memory and/or displaying the attribute discontinuities rendered in association with the second three-dimensional mesh on a display device.

2. The computer-implemented method of claim 1, wherein the step of determining comprises locally redistributing the correspondences to improve coverage of the first three-dimensional mesh.

3. The computer-implemented method of claim 1, further comprising using topological mismatches between the first and second three-dimensional meshes to propagate attribute discontinuities to the second three-dimensional mesh.

4. The computer-implemented method of claim 1, further comprising using geometrical mismatches between the first and second three-dimensional meshes to propagate attribute discontinuities to the second three-dimensional mesh.

5. The computer-implemented method of claim 1, further comprising the steps of:

determining that a closest surface or vertex included in the first three-dimensional mesh to a first vertex included in the second three-dimensional mesh;

determining that the closest surface or vertex corresponds to a convex edge or a convex vertex in the first three-dimensional mesh; and performing an inverse ray casting technique to reduce distortions caused by the closest surface or vertex corresponding to the convex edge or the convex vertex.

6. A computer-readable medium storing instructions that, when executed by a processor, cause a computer system to transfer attributes from a first three-dimensional mesh to a second three-dimensional mesh, wherein each of the first and second three-dimensional meshes includes a plurality of vertices and a plurality of edges interconnecting the vertices and defining surfaces, by performing the steps of:

determining correspondences between vertices included in the second three-dimensional mesh and surfaces included in the first three-dimensional mesh;

modifying at least one correspondence by applying a remapping function to modify a surface location in the first three-dimensional mesh associated with the at least one correspondence, wherein the remaining function implements an inverse ray-casting technique to identify the surface location based on locating, on the first three-dimensional mesh, a point where an interpolated face normal passes through a vertex in the second three-dimensional mesh associated with the at least one correspondence;

identifying discontinuous edges in the first three-dimensional mesh, wherein each discontinuous edge is associated with a surface attribute discontinuity defined by a variation of an attribute value across the discontinuous edge;

relating the discontinuous edges with the second three-dimensional mesh; and transferring attribute discontinuities from the first three-dimensional mesh to the second three-dimensional mesh based on the correspondences between the vertices included in the second three-dimensional mesh and the surfaces included in the first three-dimensional mesh and the relation between the discontinuous edges and the second three-dimensional mesh.

7. The computer-readable medium of claim 6, wherein the step of determining comprises locally redistributing the correspondences to improve coverage of the first three-dimensional mesh.

8. The computer-readable medium of claim 6, further comprising using topological mismatches between the first and second three-dimensional meshes to propagate attribute discontinuities to the second three-dimensional mesh.

9. The computer-readable medium of claim 6, further comprising using geometrical mismatches between the first and second three-dimensional meshes to propagate attribute discontinuities to the second three-dimensional mesh.

10. The computer-readable medium of claim 6, further comprising the steps of:
determining that a closest surface or vertex included in the first three-dimensional mesh to a first vertex included in the second three-dimensional mesh;
determining that the closest surface or vertex corresponds to a convex edge or a convex vertex in the first three-dimensional mesh; and
performing an inverse ray casting technique to reduce distortions caused by the closest surface or vertex corresponding to the convex edge or the convex vertex.

11. A computer system for transferring attributes from a first three-dimensional mesh to a second three-dimensional mesh, wherein each of the first and second three-dimensional meshes includes a plurality of vertices and a plurality of edges interconnecting the vertices and defining surfaces, the system comprising:
a processor; and
a memory storing instructions that, when executed by the processor, cause the computer system to:
determine correspondences between vertices included in the second three-dimensional mesh and surfaces included in the first three-dimensional mesh,
modify at least one correspondence by applying a remapping function to modify a surface location in the first three-dimensional mesh associated with the at least one correspondence, wherein the remapping function implements an inverse ray-casting technique to identify the surface location based on locating, on the first three-dimensional mesh, a point where an interpolated face normal passes through a vertex in the second three-dimensional mesh associated with the at least one correspondence,
identify discontinuous edges in the first three-dimensional mesh, wherein each discontinuous edge is associated with a surface attribute discontinuity defined by a variation of an attribute value across the discontinuous edge,
relate the discontinuous edges with the second three-dimensional mesh, and
transfer attribute discontinuities from the first three-dimensional mesh to the second three-dimensional mesh based on the correspondences between the vertices included in the second three-dimensional mesh and the surfaces included in the first three-dimensional mesh and the relation between the discontinuous edges and the second three-dimensional mesh.

12. The computer system of claim 11, wherein determine the correspondences comprises locally redistributing the correspondences to improve coverage of the first three-dimensional mesh.

13. The computer system of claim 11, wherein the instructions further cause the computer system to use topological mismatches between the first and second three-dimensional meshes to propagate attribute discontinuities to the second three-dimensional mesh.

14. The computer system of claim 11, wherein the instructions further cause the computer system to use geometrical mismatches between the first and second three-dimensional meshes to propagate attribute discontinuities to the second three-dimensional mesh.

15. The computer system of claim 11, wherein the instructions further cause the computer system to:
determine that a closest surface or vertex included in the first three-dimensional mesh to a first vertex included in the second three-dimensional mesh;
determine that the closest surface or vertex corresponds to a convex edge or a convex vertex in the first three-dimensional mesh; and
perform an inverse ray casting technique to reduce distortions caused by the closest surface or vertex corresponding to the convex edge or the convex vertex.

* * * * *

UNITED STATES PATENT AND TRADEMARK OFFICE
CERTIFICATE OF CORRECTION

PATENT NO. : 7,760,201 B2  Page 1 of 1
APPLICATION NO. : 11/493221
DATED : July 20, 2010
INVENTOR(S) : Jerome Couture-Gagnon It is certified that error appears in the above-identified patent and that said Letters Patent is hereby corrected as shown below:

In column 14, line 59, please replace "remaining" with -- remapping --.

Signed and Sealed this

Sixteenth Day of November, 2010

David J. Kappos
*Director of the United States Patent and Trademark Office*